United States Patent
Sørensen et al.

(10) Patent No.: US 10,302,310 B2
(45) Date of Patent: May 28, 2019

(54) HYDRAULIC MANIFOLD

(71) Applicant: GRUNDFOS HOLDING A/S, Bjerringbro (DK)

(72) Inventors: Søren Emil Sørensen, Ulstrup (DK); Per Hovmand, Randers NØ (DK); Steen Mikkelsen, Bjerringbro (DK); Jens Kjær Milthers, Støvring (DK); Kim Hulegaard Jensen, Rødkærsbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 87 days.

(21) Appl. No.: 15/066,313

(22) Filed: Mar. 10, 2016

(65) Prior Publication Data
US 2016/0265792 A1    Sep. 15, 2016

(30) Foreign Application Priority Data
Mar. 12, 2015   (EP) ..................................... 15158772

(51) Int. Cl.
| | |
|---|---|
| *F24D 3/12* | (2006.01) |
| *F24D 3/10* | (2006.01) |
| *F24D 3/14* | (2006.01) |
| *F24F 5/00* | (2006.01) |

(52) U.S. Cl.
CPC ........... *F24D 3/122* (2013.01); *F24D 3/1075* (2013.01); *F24D 3/125* (2013.01); *F24D 3/14* (2013.01); *F24F 5/0089* (2013.01)

(58) Field of Classification Search
CPC ........ F24D 3/1075; F24D 3/122; F24D 3/127; F24D 3/125; F24D 3/14; F16K 27/003; F24F 5/0089
See application file for complete search history.

(56) References Cited

U.S. PATENT DOCUMENTS

| | | | | |
|---|---|---|---|---|
| 4,986,870 A | * | 1/1991 | Frohlich | H05K 3/4611 156/382 |
| 5,617,898 A | * | 4/1997 | Nagai | F04F 5/48 137/884 |
| 6,164,335 A | * | 12/2000 | Hayashi | F15B 13/0817 137/269 |
| 6,345,770 B1 | | 2/2002 | Simensen | |

(Continued)

FOREIGN PATENT DOCUMENTS

DE    10 2006 010562 A1    9/2007

*Primary Examiner* — Craig Schneider
*Assistant Examiner* — Angelisa L Hicks
(74) *Attorney, Agent, or Firm* — McGlew and Tuttle, P.C.

(57) ABSTRACT

A hydraulic heating and/or cooling system hydraulic manifold is constructed in a modular manner with a main module (2). At least one load module (4) is connectable to the main module (2) and includes a hydraulic connection (22, 24) for a load circuit, and a closed-loop control device (26, 28) controlling flow through the load and for connection to an identically configured further load module (4). The at least one load module (4) includes a circuit board (44) which extends between a first (34) and a second axial end (36) of the load module (4) and which at its first (34) and second end (36) have electrical couplings (50, 52) which correspond to one another. The electrical coupling (52) at the second end (36) of the circuit board (44) can electrically conductively engage with an electrical coupling (50) at the first end (34) of the further identical load module (4).

20 Claims, 7 Drawing Sheets

(56) References Cited

U.S. PATENT DOCUMENTS

| | | | | |
|---|---|---|---|---|
| 6,357,414 B1* | 3/2002 | Kalinowski | ............... | F02D 9/02 |
| | | | | 123/198 E |
| 6,490,172 B1* | 12/2002 | Bates | ................... | H05K 1/0271 |
| | | | | 211/41.17 |
| 6,711,024 B1* | 3/2004 | Johansson | .............. | H05K 1/189 |
| | | | | 361/760 |
| 8,326,134 B2* | 12/2012 | Harper | .................. | F24D 11/004 |
| | | | | 392/312 |
| 2003/0222235 A1* | 12/2003 | Filkovski | .............. | F16K 3/0254 |
| | | | | 251/30.01 |

\* cited by examiner

Fig. 8

HYDRAULIC MANIFOLD

CROSS REFERENCE TO RELATED APPLICATIONS

This application claims the benefit of priority under 35 U.S.C. § 119 of European Patent Application 15 158 772.2 filed Mar. 12, 2015, the entire contents of which are incorporated herein by reference.

FIELD OF THE INVENTION

The invention relates to a hydraulic manifold for a hydraulic heating and/or cooling system.

BACKGROUND OF THE INVENTION

Hydraulic manifolds are used for example in heating installations with several heating circuits, in particular in combination with floor heating circuits, in order to be able individually regulate the flow of a fluid heat transfer medium through the individual circuits. Thereby, differently dimensioned manifolds are necessary, depending on the number of the heating/cooling circuits to be supplied. It is known to construct such hydraulic manifolds in a modular manner, in order to reduce the number of different manifolds for different numbers of heating/cooling circuits, wherein a module is provided for each circuit to be supplied and the modules can be connected in the desired number into a hydraulic manifold.

A separate regulating (closed-loop control) device, for example an electrometrically driven valve is necessary for each of the hydraulic circuits. This means that not only is a hydraulic connection between the modules necessary, but also an electrical connection of each individual module, with a modular construction of the manifold.

SUMMARY OF THE INVENTION

With regard to this, it is an object of the invention to provide a hydraulic manifold for a hydraulic heating and/or cooling system, which permits a simple electrical connection of individual modules of the manifold.

The hydraulic manifold according to the invention is designed for the use in a hydraulic heating and/or cooling system, i.e. it is the case of a hydraulic heating and/or cooling manifold. A fluid heat transfer medium, in particular water, is used in such a heating and/or cooling system, in order to transport heat in the system and to heat or cool objects or rooms. Such a hydraulic system can be configured as a pure heating system, in which for example rooms are to be heated from a central heat source via a hydraulic system. Conversely, the system can be configured as a cooling system, in which objects are cooled by a central cold source via the hydraulic system. Moreover, such a system can be configured as a combined system, for example in order to heat in the winter and to cool in the summer.

The hydraulic manifold according to the invention is constructed in a modular manner—has a modular configuration, so that it can be adapted to different numbers of load circuits, for example heating and/or cooling circuits. For this, the hydraulic manifold comprises a main module and at least one load module. The main module serves for the connection of the complete hydraulic manifold. The load module serves for the connection of at least one load circuit and for this comprises at least one hydraulic connection for a load circuit as well as at least one closed-loop control device for regulating (closed loop control) the flow through the load circuit connected to the hydraulic connection. The closed-loop control device for example can be configured as an electromotorically or electrothermally actuated valve. The load module is designed and configured such that it can be connected to a further identically designed and configured load module. This permits a plurality of load modules to be connected to one another or rowed onto one another, in order to form a hydraulic manifold of a desired length, which is to say with a desired number of connections for load circuits. However, it is to be understood that the load modules can also be configured in a manner such that they each permit the connection of a plurality of load circuits, and for this have a desired number of connections. Thus, for example, load modules with connections for four load circuits can be provided, wherein then a hydraulic manifold for eight load circuits can be created by way of joining together two such load modules. A closed-loop control device is preferably provided for each connection. Thereby, a hydraulic connection is preferably formed between the main module and the load module connected to the main module as well as likewise between the load modules which are connected amongst one another. Such a hydraulic connection can be configured as a feed or as a return for the individual load circuits. The main module and the load module are particularly preferably configured such that they have a feed as well as a return. The closed-loop control device can be arranged in the feed or in the return of the respective load module. If the main module and the load modules are configured such that they have only one flow path, i.e. either a feed or return, then the respective other flow path can be connected for example via a separate hydraulic manifold.

Apart from the described hydraulic connection between the individual modules, according to the invention, an electrical connection between the load modules, in particular for the electrical connection of a drive of the load modes is provided. For this, a circuit board extending from the first end to a second end of the load module is arranged in the at least one load module. Preferably, this extension direction is the same direction, in which several load modules can be rowed onto one another, which is to say the longitudinal direction of the hydraulic manifold formed from the load modules. The first and the second end of the load module are preferably directed away from one another or oppositely. The circuit board is configured such that it comprises electrical couplings which correspond to one another, at its first and second end. These couplings are preferably multi-poled. The couplings are configured such that the electrical coupling at the second end of the circuit board can electrically conductively engage with an electrical coupling at the first end of a further identical load module. This means that the electrical coupling at the first end is configured complementarily to the electrical coupling at the second end, so that the first end of the one load module can be joined with the second end of the other load module if two identical load modules are present, wherein the complementary electrical connections are electrically conductively engaged with one another. The construction of the load module is simplified due to the fact that the electrical couplings are formed directly on the circuit board, since thus all necessary electrical connections can be united or unified on a circuit board and a thus manufactured circuit board as a premanufactured component can be inserted into a housing of a load module. No further cabling is necessary.

Further preferably, the main module comprises an electrical coupling, which is configured complementarily to the electrical coupling on one end of the load module, so that such a load module can be applied onto the main module, wherein the electrical couplings of the load module and the main module electrically conductively engage. The couplings are preferably configured as plug-in couplings. A very simple electrical connection can be thus achieved, by way of the individual modules, which is to say the main module and an adjacent load module, as well as further load modules as the case may be, being able to be simply stuck together. Thus, the necessary electrical connection is created in a direct manner on joining together, so that the assembly effort is low, since a separate electrical cabling is not necessary.

Preferably, one of the two electrical couplings at the first and second end comprises female contacts and the other electrical coupling corresponding male contacts. The female and male contacts can engage with one another in the known manner when two correspondingly configured load modules are joined onto one another.

According to a preferred embodiment of the invention, the circuit board in its extension direction is configured in an elastically deformable or resilient manner, between the first and the second end. This has the advantage that tolerances can be compensated and damage to the circuit board and can be avoided on rowing together several load modules when these are fixedly stuck together, since the circuit board can elastically yield in the joining direction. Thus, on the one hand, a secure electrical connection can be achieved at the electrical couplings, and on the other hand electrical components can be protected from damage due to too great force effect on joining together the electrical couplings. The spring effect of the circuit board preferably results from a suitable shaping of the circuit board.

Preferably, the circuit board comprises a meandering section which effects a resilient configuration. Such a meandering section for example can be configured by way of lateral indentations or recesses into the circuit board, wherein a winding or meandering structure is thus formed between the indentions. Thus, an elastic deformation of the individual windings or of the meandering section is possible given a sufficient elasticity of the material of the circuit board, so that as a whole a spring effect is achieved in the extension direction of the circuit board, between the first and the second end.

The circuit board is connected in the load module to the closed-loop control device or to the electrical drive of the closed-loop control device, preferably by way of a plug-in connection. This permits a very simple assembly of the load module, since the necessary electrical connections can be created by plug-in connections. Moreover, such a configuration and design is very maintenance-friendly, since the plug-in connection can be separated again, for example in order to be able to exchange a closed-loop control device or its drive.

The circuit board preferably carries an electronic module control device or electronic components which form such a module control device, wherein the module control device serves for communication with a manifold control device which is preferably arranged in the main module and is configured for activation of the closed-loop control device. The manifold control device is preferably configured such that it specifies the opening degree for the closed-loop control device of the load module. The manifold control device is particularly preferably configured such that it can activate a plurality of load modules or their closed-loop control devices. The manifold control device for this can for example cooperate with room thermostats in rooms which are to be controlled with regard to temperature and can specify the opening degree for the individual closed-loop control devices on the basis of the temperature signals of these room thermostats. The central activation of the individual closed-loop control devices of several load modules thereby has the advantage that the closed-loop control devices can be controlled in an energy-optimized manner, so that for example in each case always only one drive of a closed-loop control device is simultaneously in operation, so that the total current for the drives of the closed-loop control devices can be kept low. The module control devices serve for receiving the control signals from the manifold control device and for activating the associated closed-loop control device of the load module. The module control device thus forms a communication interface of the load modules to the manifold control device. In particular, the control signals can be transmitted from the manifold control device to the individual load modules via a bus system, to which the module control devices of several load modules are connected. A very simple electrical connection is rendered possible due to the fact that the electronic component of the module control device are arranged on the circuit board which likewise comprises the electric couplings, since the essential electronic elements of the load module can thus be unified and preassembled on the circuit board.

Particularly preferably, the electric couplings at the first end and the second end of the load module are connected via the circuit board in a manner such that electrical signals are led through from the electrical coupling at one of the ends to the electrical coupling at the other end. This permits a multitude of load modules configured in such a manner to be able to be rowed on one another by way of sticking the electric couplings into one another at the ends of the load modules which face one another. Thus, a continuous electric connection through all rowed-together load modules is achieved via the electric couplings and the circuit boards. Thereby, the electrical connections are preferably configured such that all load modules are supplied with energy and moreover electric control signals can be led through the load module to a following load module. Thus, in particular, a data bus can be formed, which can extend over several load modules which are rowed onto one another, in order to connect the module control devices of these load modules, to a manifold control device for data communication, as has been described previously.

The manifold control device is preferably integrated into the main module. There, it can further preferably be integrated into the electronic control device of a circulation pump arranged in the main module. The construction is further simplified by way of this, since essential electronic components or control devices can thus be grouped together.

According to a further preferred embodiment, at least one sensor which is electrically connected to the circuit board and is further preferably arranged directly on the circuit board, is arranged in the at least one load module. With regard to this sensor, in particular it can be the case of a temperature sensor which directly or indirectly detects the temperature on or in one of the hydraulic connections or in one of the flow paths in the load module. The load module further preferably can comprise a module control device for this, in particular a module control device as has been described previously and which detects the signals of the at least one sensor and transmits them to a manifold control device which in particular can be arranged in the main module. An electrical connection, in particular a data bus which is formed by the circuit board in the described manner can also be applied for this. The signals or readings of the at least one sensor can then preferably be used by the manifold control device for the control or regulating (closed-loop control) of the associated closed-loop control device of the load module.

The at least one load module further preferably comprises a module housing, in which a receiving space is formed, in which the circuit board is inserted, wherein the receiving space at the two ends comprises coupling openings, through which the electric couplings on the circuit board extends outwards or are accessible from the outside. This permits a particularly simple construction, since the necessary electrical couplings or connections of the complete load module are formed at the two ends of the module housing, without further electric connections having to be created between the electric connections on the outside of the module housing and the circuit board, after insertion of the circuit board into the module housing. The couplings of the circuit board form connection plugs situated directly on the outer sides of the load modules. The module housing in its inside moreover preferably defines at least one hydraulic connection or a hydraulic flow path. The module housing is preferably manufactured as an injection module part of plastic.

At least one hydraulic flow path is preferably formed in the module housing, and the receiving space for the circuit board is separated from the hydraulic flow path. Thus, the circuit board is protected in the receiving space, in particular from contact with the medium, for example water, which flows in the hydraulic flow path.

According to a further preferred embodiment, the module housing comprise a drive receiving space which is connected to the hydraulic flow path and in which the closed-loop control device or the electric drive of the closed-loop control device is arranged. The closed-loop control device can be inserted into the drive receiving space as a premanufactured unit, in particular as a unit of the drive and valve element. A multi-part construction is however also possible. Thus, the closed-loop control device for example can comprise a valve device and a drive which are connected to one another via a coupling such that the drive can be separated from the closed-loop control device. This can be advantageous for repair purposes. Further preferably, at least one seal element, in particular an O-ring, which seals the hydraulic flow path to the outside can be provided between the closed-loop control device and the drive receiving space. The receiving space for the circuit board which has been described beforehand is preferably likewise separated from the drive receiving space, so that no moisture can penetrate from the flow path into the receiving space, in which the circuit board with the electric or electronic components is situated, in the case of a leakage of the described seal.

The regulating device or its electric drive is further preferably electrically connected to the circuit board via a connection element which is arranged outside the module housing, wherein the receiving space for the circuit board preferably comprises a connection opening, through which the connection element extends to the circuit board. The drive receiving space preferably likewise comprises an opening, through which the connection element can be connected to the closed-loop control device or to the electric drive of the closed-loop control device. Thereby, the connection opening of the receiving space and the opening of the drive receiving space in each case are preferably open to the outside and not connected to one another in a direct manner. The connection element is preferably configured such that it has an electric plug-in connection to the circuit board and/or an electric plug-in connection to the closed-loop control device, so that a simple assembly is possible. It is possible to make do without a direct connection between the receiving space and the drive receiving space by way of such a connection element which is applied from the outside, so that the circuit board in the receiving space is protected from contact with moisture from the flow path, in the described manner.

The closed-loop control device is preferably an electrically driven valve or an electrically driven pump. The electrically driven valve can e.g. be an electromotorically driven valve, in particular a valve which is driven via an electrical stepper motor. However, an electromagnetic valve or an electrothermally operated valve can also be used for example. The valves are preferably configured such that they can be changed in their opening degree, wherein this can be effected via an activation of the electric drive via the manifold control device. For this, a desired opening degree can be transmitted from the manifold control device to the module control device then controlling or activating the respective drive of the closed-loop control device such that the desired valve opening degree is reached. The pump can preferably be regulated (closed-loop controlled) in its speed in the case that an electrically operated pump is applied, wherein the speed regulation is then preferably assumed by the described manifold control device, wherein necessary speed signals are transmitted from the valve control device preferably to a module control device of the respective load module, and the module control device then activates a connected pump at the desired speed or closed-loop controls the speeds, the differential pressure or the flow, to a desired setpoint.

According to a further preferred embodiment of the invention, the at least one load module comprises at least one flow path which extends from the first to the second end and which is connected via the closed-loop control device to the at least one hydraulic connection. With regard to this flow path, it can be the case of a feed or a return, wherein the hydraulic connection is accordingly a feed connection or a return connection for a load circuit to be connected. The described flow path thus connects two ends of the load module which are away from one another, in particular two axial ends of the load module which are away from one another, such that a continuous flow path which extends through the several load modules and creates a connection to a hydraulic flow path in the main module is formed when rowing or joining several load modules onto one another. Different load circuits can be hydraulically connected to the main module in each case via one load module in this manner. At least one branching from this continuous flow path to the hydraulic connection is then provided in the load module in each case.

It is to be understood that the load modules are preferably provided for connection of an individual load circuit in each case. Load modules which comprise connections for several load circuits are however also possible, wherein then preferably several closed-loop control devices for the several load circuits are arranged in the load module. Such load modules which serve for the connection of several load circuits can also be configured in the described manner such that then can be joined onto one another, in order to form a hydraulic manifold with a desired number of connections for load circuits.

Further preferably, the at least one load module has a first hydraulic flow path and a second hydraulic flow path which each extend from the first to the second end and are in each case connected to at least one hydraulic connection of the load module for the connection of a load circuit. The closed-loop control device thereby lies in the connection between one of the flow paths and an associated hydraulic connection of the load module. This can be a feed or a return, as described. One of the two hydraulic flow paths thereby forms the feed and the other hydraulic flow path forms the return. Accordingly, one hydraulic connection comprises a feed connection, and the other hydraulic connection forms a return connection for a load circuit which is to be connected to the load module. The hydraulic flow paths are preferably completely separated from one another in the load module.

Preferably, the at least one flow path in the at least one load module at the first end ends in a first hydraulic coupling, and at the second end in a second hydraulic coupling, and the first and the second hydraulic coupling are configured corresponding to one another in a manner such that the second hydraulic coupling at the second end of the load module is connectable in a fluid-leading manner to the first hydraulic coupling at the first end of an identically configured second load module. Thus, several load modules can be rowed onto one another, wherein the hydraulic couplings engage with one another such that a continuous flow path which is sealed to the outside is formed from the one to the next load module. The first load module is preferably connected via a hydraulic coupling accordingly to the main module and to a flow path which is formed in the main module. Thus, all these load modules can be hydraulically connected in series to the main module when rowing several load modules onto one another. In the case that a first and a second hydraulic flow path are formed in the load modules, then these at their ends in each case comprise suitably configured hydraulic couplings, so that in each case the first flow paths and the second flow paths can be connected amongst one another such that a first flow path extending through all load modules and a second flow path extending through all load modules are formed when rowing several load modules onto one another. The first load module which is adjacent the main module is thereby preferably connected to a first flow path and to a second flow path in the main module. Thus, the feed and return of the individual circuits can be connected via the load modules to a feed and return in the main module, wherein the first flow path for example forms the feed and the second flow path forms the return.

Particularly preferably, the hydraulic manifold comprises a main module and several load modules which are configured in the previously described manner, wherein the load modules are joined onto one another such that a second end of a first load module is engaged in each case with a first end of a second load module which is subsequent to this. One of the load modules is connected in a corresponding manner to the main module. The connections between the individual load modules as well as between the load module and the main module are preferably configured in a releasable manner, so that individual ones of these load modules can be exchanged as the case may be, or the main module can be exchanged the case may be.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, the hydraulic manifold which is described here by way of example is configured for the application in a hydraulic heating and/or cooling installation, in which heat is transported via a fluid heat transfer medium, in particular water. Thereby, either heat can be transported from a central heat source to several consumers, or, in the case of a cooling system, can be led away from the several consumers to a central cooling device.

Figure 1:
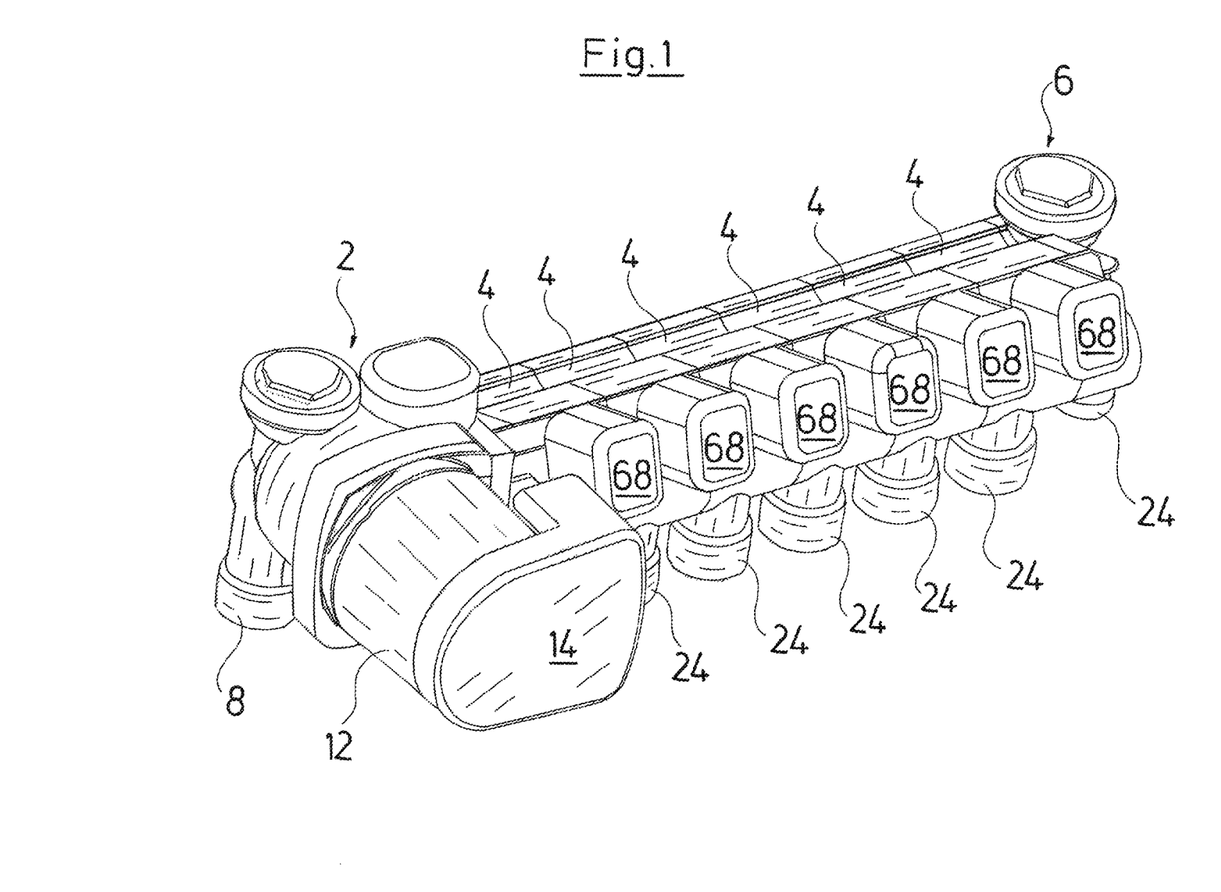
FIG. 1 is a perspective total view of a hydraulic manifold according to the invention.
Figure 2:
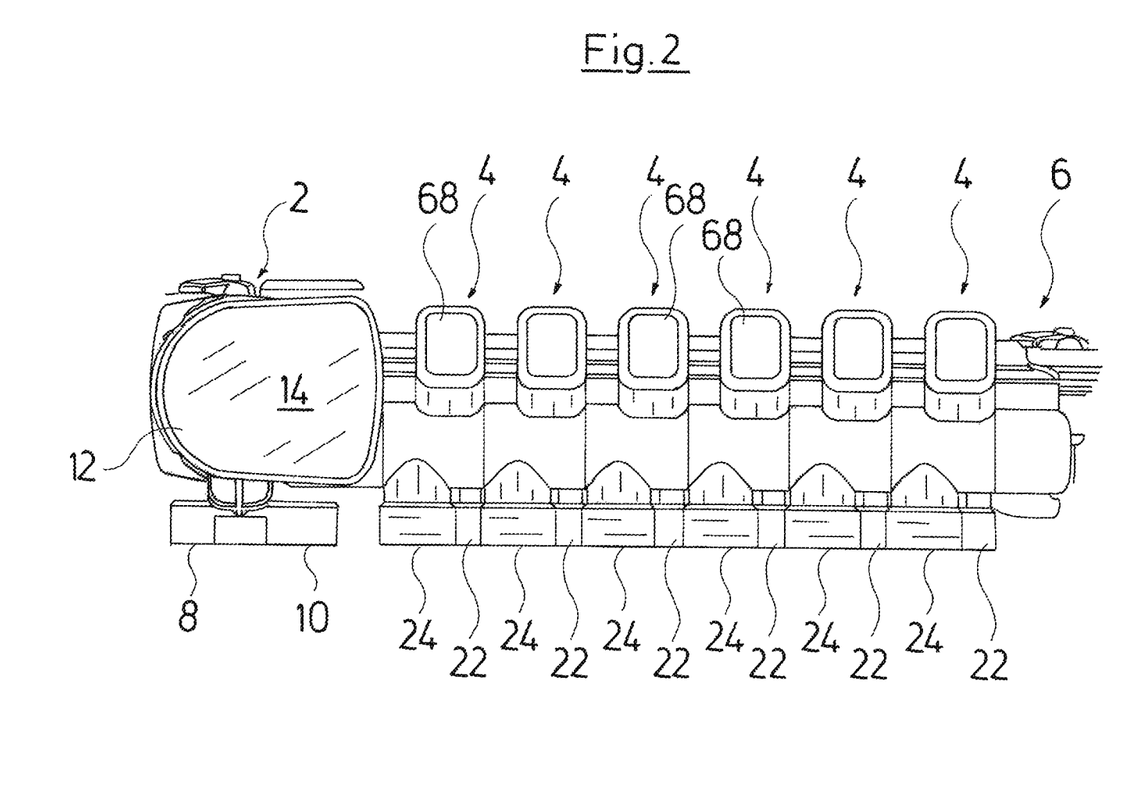
FIG. 2 is a front view of the manifold according to FIG. 1.

The shown hydraulic manifold has a modular configuration and comprises a main module 2 and in the shown example six load modules 4. The load modules 4 are all configured identically. It is to be understood that also more or less load modules can be rowed or chain connected onto one another in a corresponding manner instead of an arrangement of six load modules. A first load module 4 is connected to the main module 2. The remaining load modules are applied in series one after the other onto this first load module 4. The last load module 4 is closed by a closure module 6 at the side which is away from the main module 2. The hydraulic manifold serves for the distribution of a fluid heat transfer medium onto several load circuits and for this comprises a feed and a return in the example shown here. The main module 2 comprises an entry 8 for the feed and an exit 10 for the return. Two flow paths which are separate from one another and which run from the entry 8 and the exit 10 to that side surface of the main module 2 which faces the load modules 4, are formed in the inside of the main module 2. Hydraulic couplings for the connection of the feed and of the return to the load modules 4, as are described hereinafter, are present on this side surface. The main module 2 moreover comprises a circulation pump assembly 12, whose impeller is situated in the first flow path which is adjacent the entry 8 and which forms the feed. The circulation pump assembly 12 comprises an electronics housing 14, in which a manifold control device is arranged, wherein this manifold control device on the one hand controls the speed of the circulation pump assembly 12 and on the other hand the individual load modules 4. For this, according to a preferred embodiment, the main module 2 can receive a temperature signal from at least one temperature sensor, wherein the control of the load modules as well as of the circulation pump assembly as the case may be, is effected on the basis of this temperature signal. Further preferably, several temperature sensors, for example room temperature sensors can be provided, which transmit the temperature signals to the main module 2. Room temperature sensors for example can be arranged in rooms or building parts, which are to be temperature controlled via the load modules. It is thus possible to control each load module 4 in dependence on an individual temperature signal.

Figures 4, 5:
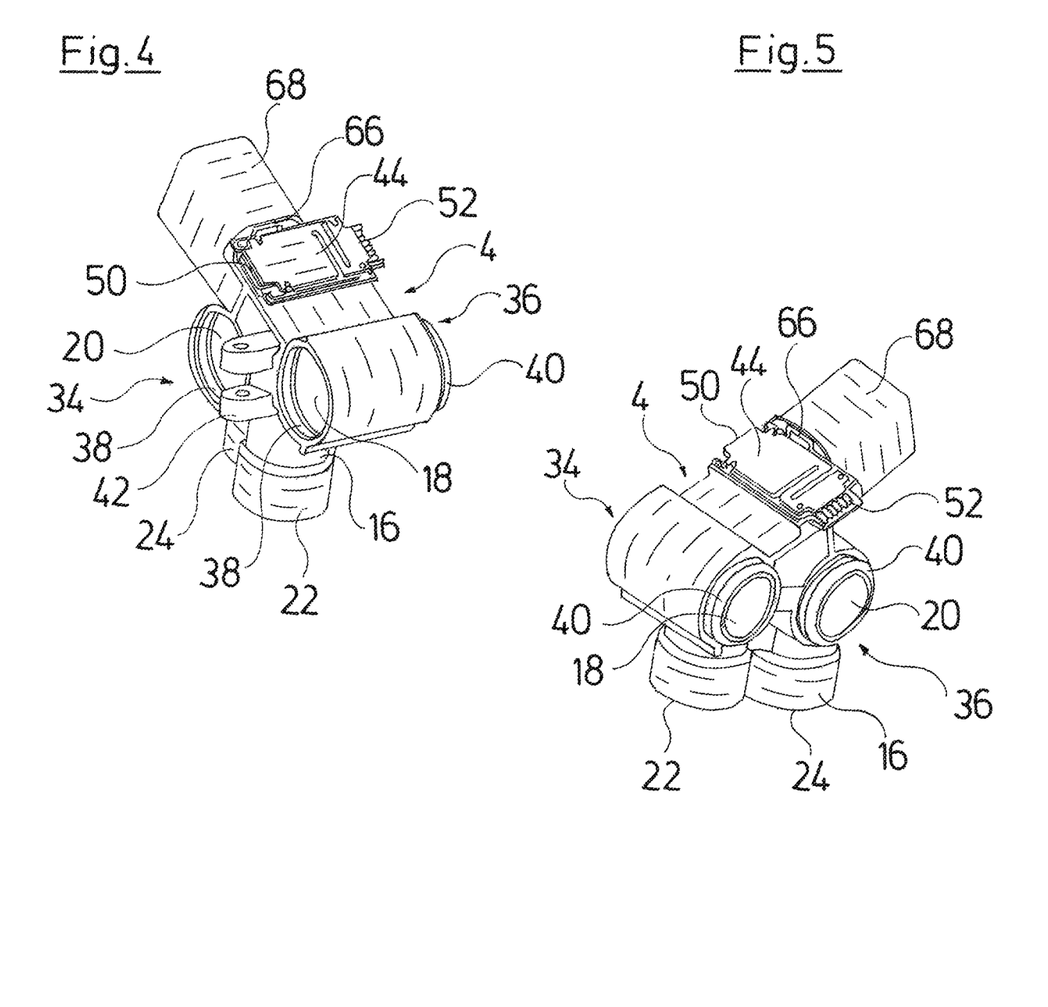
FIG. 4 is a perspective view of a load module, in the partly opened condition.
FIG. 5 is a perspective view of the load module according to FIG. 2, seen from the opposite side.
Figure 6:
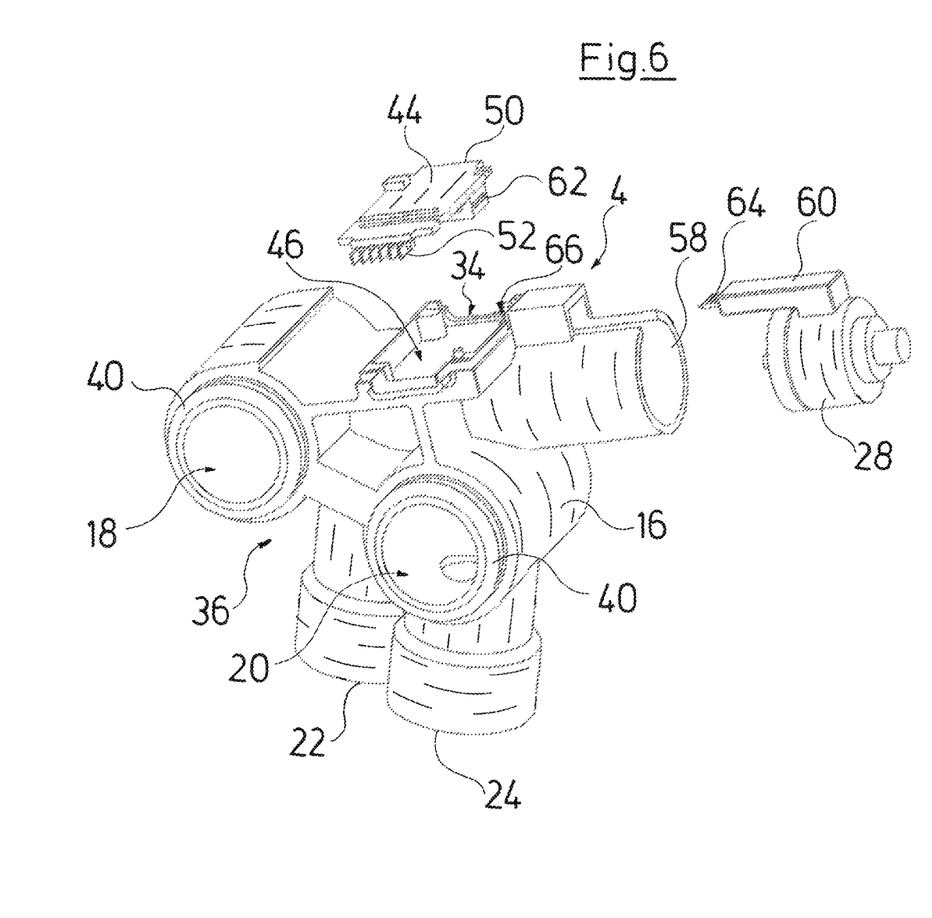
FIG. 6 is an exploded view of the load module according to FIGS. 4 and 5.
Figure 7:
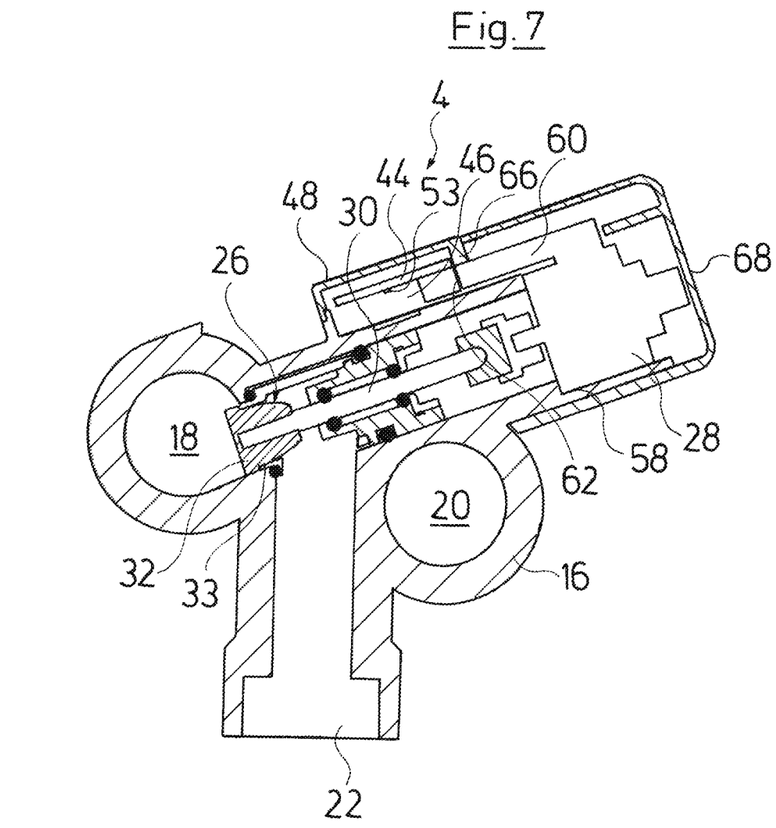
FIG. 7 is a sectioned view of the load module according to FIGS. 4 to 6.

The individual load modules 4 each comprise a module housing 16 which is preferably configured as a single-part plastic component. A first flow path 18 and a second flow path 20 are formed in the module housing 16, of which the first flow path 18 for example forms the feed and the second flow path 20 the return. The first flow path 18 is connected to a first hydraulic connection 22, and the second flow path 20 to a second hydraulic connection 24. The first hydraulic connection 22 thus forms a feed connection for a load circuit and the second hydraulic connection preferably forms a return connection for this load circuit. A valve 26 via which the free flow cross section from the first flow path 18 into the first hydraulic connection 22 can be set is situated in the connection between the first flow path 18 and the first hydraulic connection 22. The valve 26 forms part of a closed-loop control device and is connected to the drive motor 28. The drive motor 28 drives the valve 26 in rotation, wherein the valve element 32 moves backwards and forwards via a spindle drive 30 and is movable out of contact from a valve seat 33 and back into contact again.

Figure 3:
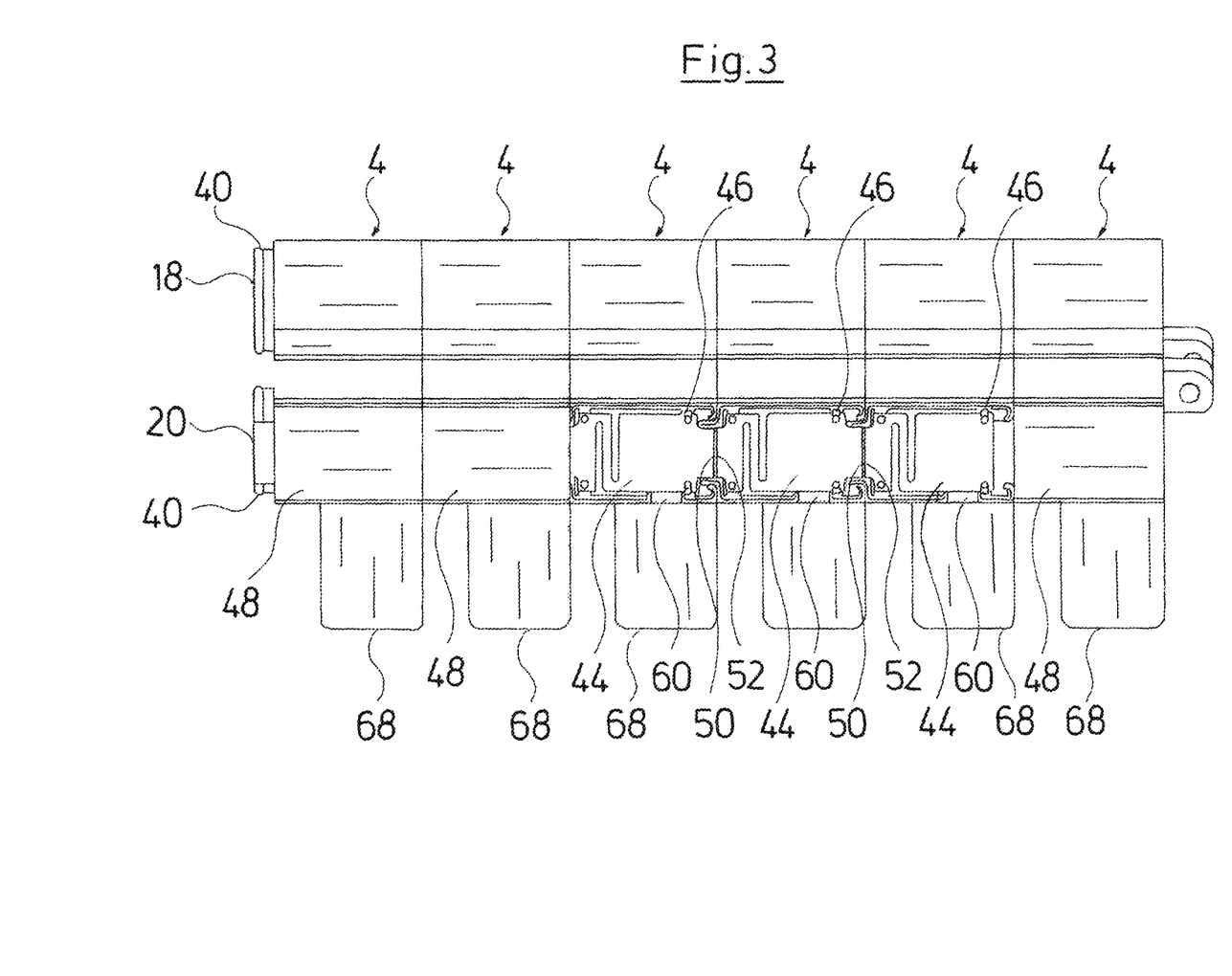
FIG. 3 is a plan view of an arrangement of load modules of the hydraulic manifold according to FIGS. 1 and 2, in the partly opened condition.

The first flow path 18 and the second flow path 20 extend parallel in the longitudinal direction through the load module 4 from a first end 34 to an opposite second end 36. The first flow path 18 as well as the second flow path 20 each end in a first hydraulic coupling 38, at the first end 34. The first flow path 18 and the second flow path 20 in each case end in a second hydraulic coupling 40, at the opposite second end 36. Thereby, the first hydraulic coupling 38 is configured as a female coupling element, whereas the second hydraulic coupling 40 are each configured as a male coupling element. However, a reverse design or an axial contact of the couplings onto one another would also be possible. The second hydraulic couplings 40 of one load module 4 come into sealing engagement with the first hydraulic couplings 38 of an adjacent load module 4 when the load modules 4 are rowed onto one another or stuck onto one another in the shown manner, so that a continuous first flow path 18 and a continuous second flow path 20 are formed through both load modules 4. The main module 2 is provided with suitable first hydraulic couplings 38, into which the second hydraulic couplings 40 of the first load module 4 can engage, in order to create a hydraulic connection between the first flow path 18 and the second flow path 20 to the corresponding flow paths in the inside of the main module 2 and its connections 8 and 10 (entry 8 and exit 10).

Moreover, mechanical connections 42 are present apart from the described hydraulic connections between the individual load modules 4, in order to mechanically connect the individual load modules 4 to one another. The mechanical connections 42 can be configured in the most varied of manners and be additionally secured via bolts, clips, screws or likewise. Alternatively, the hydraulic couplings 38 and 40 are configured in such a mechanically stable manner that one can make do without additional mechanical connections 42.

Electrical connections between the load modules 4 are also created apart from the described hydraulic and mechanical connections. The load modules 4 for this in each case comprise a circuit board 44 which is arranged in the module housing 16 in a receiving space 46. The receiving space 46 is closed by way of a cover 48.

Figure 8:
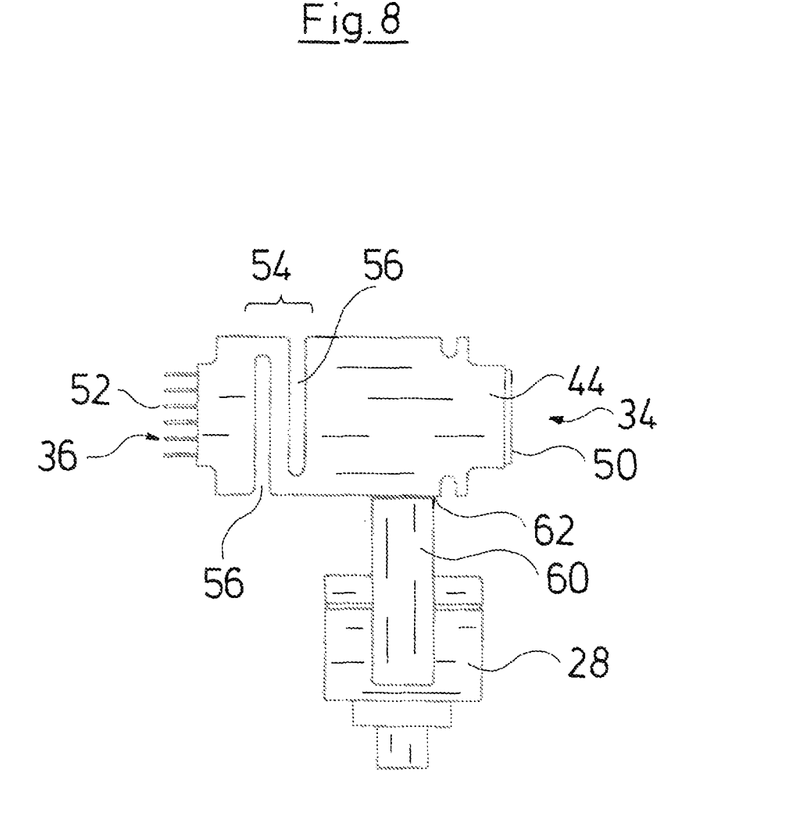
FIG. 8 is a plan view of the circuit board and the closed-loop control device of the load module according to FIGS. 4 to 7.

The circuit board 44 is configured such that it extends from the first end 34 to the second end 36 of the load module 4. Thereby, the circuit board 44 at its first end comprises a first electrical plug-in coupling 50 which in this example is configured as a female coupling. The circuit board 44 at the opposite second end comprises a second electrical plug-in coupling 50 which in this example is configured as a male coupling. A reverse design would also be possible. The first electrical plug-in coupling 50 and the second electrical plug-in coupling 52 are configured in a multi-poled manner and are configured complementarily to one another, so that the electric plug-in contacts of the first electrical plug-in coupling and of the second electrical plug-in coupling 52 of two adjacent load modules 4 can come into electrical engagement with one another. The receiving space 46 for this comprises an opening in each case at the first end 34 and at the second end 36, and these openings are not closed by the cover 48, so that adjacent first electrical plug-in couplings 50 and second electrical plug-in couplings 52 can come into electrically conductive engagement with one another. The circuit boards 44 of adjacent load modules 4 can thus create a continuous electrical connection between all load modules 4 which are rowed onto one another. For this, preferably strip conductors 44 which form a bus system are formed on the circuit boards 44, so that all load modules 4 can be supplied with energy and moreover can be controlled by the manifold control device in the electronics housing 1 of the main module 2. For this, a data communication between the module control devices formed on the circuit boards 44 and the manifold control device in the electronics housing 14 is envisaged via the described bus system. The electronic components of the manifold control device are preferably connected to the electrical connections in the main module 2 which come into electrically conductive connection with the second electrical plug-in coupling 52 of the first load module 4 adjacent the main module 2. A cable connection can alternatively be provided.

Moreover, in each case a sensor 53 which can be an infra-red temperature sensor for example, and which detects the temperature in the module housing or one of the flow paths, is formed on the circuit boards 44. The sensor signals which are acquired by the sensor are transmitted by the module control device via the described bus system to the manifold control device.

The circuit boards 44 in their longitudinal direction are configured in a resilient manner from the first end 34 to the second end 36. For this, the circuit boards 44 each can be a meanderingly shaped elastic section 54. This resilient or elastic section 54 which is characterized in FIG. 8, in this embodiment is formed by way of two indentations 56 which are incorporated into the circuit board 44 from opposite sides and which lead to a meandering or winding course of the circuit board in the elastic section 54. The elastic section 54 has the effect that the circuit board 44 can be elastically compressed when a pressing force is applied onto the first electrical plug-in coupling 50 and the second electrical plug-in coupling 52. By way of this, one can ensure that the plug-in couplings 50 and 52 on the one hand can securely come into engagement and on the other hand that a plastic deformation or a damage to the circuit boards 44 with too great a force application does not thereby occur, when two load modules 4 are rowed onto one another. Manufacturing tolerances can moreover be compensated in such a manner.

As is to be recognized in FIG. 7, the receiving space 46, in which the circuit board 44 is situated, is completely separated from the flow paths 18 and 20 and the region, in which the valve 26 is situated. Thus, the circuit board 44 is securely protected from moisture. The drive motor 28 is arranged in a drive receiving space 58 which likewise has no direct connection to the receiving space 46, in which the circuit board 44 is situated. The drive motor or the drive 28 in contrast is connected via a connection element 60 to the circuit board 44. A third plug-in coupling 62 whose plug-in direction in this example is directed at right angles to the plug-in direction of the first electrical coupling 50 and the second electrical coupling 52 is arranged on the circuit board 44 for this. The connection element 60 engages with corresponding plug-in contacts 64 into the third plug-in coupling 62. Thereby, the connection element 60 extends through an opening 66 into the receiving space 46. The opening 66 however does not directly face the inside of the drive receiving space 46, but in contrast is open to the outer side of the module housing 16. It is thus ensured that moisture cannot penetrate into the inside of the receiving space 46 via the drive receiving space 48 in a direct manner, even in the case of the valve 46 having a leak. The connection element 60 in this example is fixedly connected to the drive motor 28. However, it is to be understood that an additional plug-in connection could also be applied here.

The drive receiving space 58 with the inserted drive motor 28 is covered to the outside by a cover cap 68. The cover cap 68 thereby also covers the connection element 60.

In the shown embodiment examples, a load module 4 in each case serves for the control of a heating or cooling circuit and for this comprises a valve 26 or, as the case may be, a pump. However, it is to be understood that load modules 4 which are configured for the control of several load circuits and for this contain several valves 26 in a module housing 16 can also be provided. An individual module control device is then preferably provided for each of the valves. Alternatively, a common module control device can be provided, which individually activates several valves 26 or their drive motors 28, wherein the control commands can preferably be transmitted from the main module and the manifold control device arranged in the electronics housing of this main module, to the module control device via the described electrical contacts. Electrical connections can also be arranged in the previously described manner, also between such load modules 4 which are configured for the control of several load circuits, so that these load modules 4 can be rowed or stuck onto one another, in order to form a hydraulic manifold.

In the embodiment examples shown here, each load module 4 comprises two flow paths, specifically the first flow path 18 and the second flow path 20. However, it would also be conceivable to construct a hydraulic manifold in a corresponding manner, which comprises more or less than two flow paths. Thus, for example the second flow path 20 could be done away with and corresponding hydraulic connections of the connected load circuits could be effected in a separate hydraulic manifold.

While specific embodiments of the invention have been shown and described in detail to illustrate the application of the principles of the invention, it will be understood that the invention may be embodied otherwise without departing from such principles.

APPENDIX

List of Reference Numerals

2—main module
4—load module
6—closure module
8—entry
10—exit
12—circulation pump assembly
14—electronics housing
16—module housing
18—first flow path
20—second flow path
22—first hydraulic connection
24—second hydraulic connection
26—valve
28—drive motor
30—spindle drive
32—valve element
33—valve seat
34—first end
36—second end
38—first hydraulic coupling
40—second hydraulic coupling
42—mechanical connection
44—circuit board
46—receiving space
48—cover
50—first electrical plug-in coupling
52—second electrical plug-in coupling
53—sensor
54—elastic section
56—indentations
58—drive receiving space
60—connection element
62—third plug-in coupling
64—plug-in contacts
66—opening
68—cover cap

What is claimed is:

1. A heating and/or cooling hydraulic manifold for a hydraulic heating or cooling system or, hydraulic heating and cooling system, the heating and/or cooling hydraulic manifold having a modular configuration for use with water as a fluid heat transfer medium and comprising:
    a main module;
    at least one load module connectable to the main module, the least one load module comprising:
    at least one hydraulic connection for a load circuit, the at least one hydraulic connection receiving the water;
    at least one closed-loop control device for a closed-loop control of flow through the load circuit connected to the at least one hydraulic connection and a further load module connection to connect to a further identically configured load module; and
    a circuit board extending between a first and a second end of the at least one load module with a first axial end and a second axial end comprising first end and second end electrical couplings which correspond to one another in a manner such that the second electrical coupling of the circuit board can electrically conductively engage with a first end electrical coupling of a further identical load module, the circuit board having a resilient or elastic section between a first axial end and a second axial end, wherein the resilient or elastic section has the shape of a winding course, with indentations perpendicular to a joining direction, wherein the resilient or elastic section of the circuit board elastically yields in the joining direction when the circuit board is connected to another circuit board.

2. A hydraulic manifold according to claim 1, wherein one of the first end and second end electrical couplings comprises female contacts, and the other of the first end and second end electrical couplings comprises corresponding male contacts.

3. A hydraulic manifold according to claim 1, wherein the circuit board has a meandering section which effects the resilient configuration.

4. A hydraulic manifold according to claim 1, wherein the circuit board is electrically connected to the closed-loop control device via a plug-in connection.

5. A hydraulic manifold according to claim 1, wherein the circuit board carries an electronic module control device configured to communicate with a manifold control device arranged in the main module and configured to activate the closed-loop control device.

6. A hydraulic manifold according to claim 1, wherein the first end and second end electrical couplings are connected via the circuit board such that electrical signals are led through from the electrical coupling on one of the ends to the electrical coupling at the other end.

7. A hydraulic manifold according to claim 1, further comprising at least one sensor electrically connected to the circuit board and arranged in the at least one load module.

8. A hydraulic manifold according to claim 1, wherein the at least one load module comprises:
a module housing defining a receiving space into which receiving space the circuit board is inserted, wherein the receiving space at both ends comprises coupling openings, through which the electrical couplings extend outwards or are accessible from the outside.

9. A hydraulic manifold according to claim 8, wherein the module housing forms at least one hydraulic flow path and the receiving space for the circuit board is separated from the hydraulic flow path, the joining direction being parallel to the at least one hydraulic flow path.

10. A hydraulic manifold according to claim 9, wherein the module housing comprises a drive receiving space connected to the hydraulic flow path and the closed-loop control device is arranged in the drive receiving space.

11. A hydraulic manifold according to claim 8, wherein the closed-loop control device is electrically connected to the circuit board via a connection element arranged outside the module housing and the receiving space for the circuit board comprises a connection opening, through which the connection element extends to the circuit board.

12. A hydraulic manifold according to claim 1, wherein the closed-loop control device is an electrically operated valve or an electrically operated pump.

13. A hydraulic manifold according to claim 1, wherein the at least one load module comprises at least one flow path which extends from the first to the second end and which is connected via the closed-loop control device to the at least one hydraulic connection.

14. A hydraulic manifold according to claim 13, wherein the load module comprises a first hydraulic flow path and a second hydraulic flow path which in each case extend from the first to the second end and are in each case in connection with a hydraulic connection of the load module for the connection of a load circuit.

15. A hydraulic manifold according to claim 13, wherein the at least one flow path at the first end ends in a first hydraulic coupling and the at least one flow path at the second end ends in a second hydraulic coupling, and the first hydraulic coupling and the second hydraulic coupling are configured corresponding to one another in a manner such that the second hydraulic coupling at the second end of the load module can be fluidically connected to the first hydraulic coupling at the first end of an identically configured second load module.

16. A hydraulic manifold according to claim 1, wherein the circuit board has a resilient or elastic section, the resilient or elastic section comprising two indentations, one of the indentations being located on one side of the circuit board and another one of the indentations being located on another side of the circuit board.

17. A hydraulic manifold according to claim 1, wherein the circuit board has a resilient or elastic section, the resilient or elastic section comprising at least one slot having an opening on one side of the circuit board, the at least one slot extending in a direction traversing the joining direction, at least a portion of the at least one slot being defined by an outer peripheral edge portion of the circuit board.

18. A heating and/or cooling hydraulic manifold for a hydraulic heating or cooling system or, hydraulic heating and cooling system, the heating and/or cooling hydraulic manifold comprising a heating and/or cooling hydraulic manifold structure having a modular configuration and the heating and/or cooling hydraulic manifold structure comprising:
a main module;
at least one load module connectable to the main module, at least the main module and the at least one load module defining at least one hydraulic flow path, wherein a fluid heat transfer medium moves along the at least one hydraulic flow path, the fluid heat transfer medium comprising water:
at least one hydraulic connection for a load circuit, the at least one hydraulic connection receiving the fluid heat transfer medium;
at least one closed-loop control device for a closed-loop control of flow through the load circuit connected to the at least one hydraulic connection and a further load module connection to connect to a further identically configured load module; and
a circuit board extending between a first and a second end of the at least one load module with a first axial end and a second axial end comprising first end and second end electrical couplings which correspond to one another in a manner such that the second electrical coupling of the circuit board can electrically conductively engage with a first end electrical coupling of a further identical load module in a joining direction, wherein the heating and/or cooling hydraulic manifold structure regulates a flow of the water through the circuit, wherein the circuit board having a resilient or elastic section between a first axial end and a second axial end, wherein the resilient or elastic section has the shape of a winding course, with indentations perpendicular to a joining direction, wherein the resilient or elastic section of the circuit board elastically yields in the joining direction when the circuit board is connected to another circuit board.

19. A hydraulic manifold according to claim 18, wherein the circuit board has a resilient or elastic section, the resilient or elastic section comprising two slots and a meandering resilient or elastic section defining at least a portion of each of the two slots, one of the slots having an opening defined on one side of the circuit board, another one of the slots having an opening defined on another side of the circuit board, the one side of the circuit board being located opposite the another side of the circuit board.

20. A hydraulic manifold according to claim 18, wherein the circuit board has a resilient or elastic section, the resilient or elastic section comprising at least one slot having an opening on one side of the circuit board, the at least one slot extending in a direction traversing the joining direction, at least a portion of the at least one slot being defined by an outer peripheral edge portion of the circuit board.

* * * * *